United States Patent [19]

Wang et al.

[11] Patent Number: 4,980,866

[45] Date of Patent: Dec. 25, 1990

[54] COMMON OFFSET DEPTH MIGRATION WITH RESIDUAL MOVEOUT CORRECTION

[75] Inventors: Shein S. Wang; Thomas D. Cavanaugh; Douglas W. Hanson, all of Ponca City, Okla.

[73] Assignee: Conoco Inc., Ponca City, Okla.

[21] Appl. No.: 444,509

[22] Filed: Nov. 30, 1989

[51] Int. Cl.[5] .............................................. G01V 1/36
[52] U.S. Cl. ........................................ 367/52; 367/50
[58] Field of Search ...................... 367/38, 50, 51, 52, 367/73, 53; 364/421

[56] References Cited

U.S. PATENT DOCUMENTS

| H482 | 6/1988 | Berryhill et al. | 367/38 |
|---|---|---|---|
| 4,241,429 | 12/1980 | Bloomquist et al. | 367/52 |
| 4,736,347 | 4/1988 | Goldberg et al. | 367/46 |
| 4,745,585 | 5/1988 | Larner | 367/50 |
| 4,766,574 | 8/1988 | Whitmore, Jr. et al. | 367/50 |
| 4,802,146 | 1/1989 | Moeckel | 367/52 |
| 4,802,147 | 1/1989 | Moeckel | 367/57 |
| 4,813,027 | 3/1989 | Tieman | 367/52 |
| 4,878,204 | 10/1989 | Black et al. | 367/53 |

OTHER PUBLICATIONS

Etgen, John T.; "Interval Velocity Estimation Using Prestack Depth Migration (B-10)", May 29-Jun. 2, 1989, Geophysics Dept., Stanford University, pp. 55.

Etgen, John T., "Velocity Analysis Using Prestack Depth Migration: Linear Theory"; Oct. 30-Nov. 3, 1988; Stanford University; Exp. Abs. with Biog., 1988 Technical Program, vol. 2, S9.7, pp. 909-912.

Etgen, John T., "Velocity Analysis Using Prestack Depth Migration: Applying the Linear Theory"; Rept. No. 60, May 1989, pp. 25-40; Stanford Exp. Proj.; Bd. of Trustees, Leland Stanford Junior Univ.

Primary Examiner—Ian J. Lobo

[57] ABSTRACT

In applying residual movement correction to common offset depth migrated data, common offset depth migration is applied using the best available velocity/depth model. Post migrated parts, which are depth migrated common midpoint gathers, are saved. The post migrated parts are treated as if they were in time not depth. Normal movement based on a constant velocity is removed. Velocity functions time-velocity pairs, are derived for the post migrated parts with normal movement removed using a standard velocity analysis program. Normal moveout based on these velocity functions is applied. The events on the post migrated parts ae not imaged to the same depth. The corrected post migrated parts are then stacked and displayed.

6 Claims, 5 Drawing Sheets

COMMON OFFSET DEPTH MIGRATION WITH RESIDUAL MOVEOUT CORRECTION

BACKGROUND OF THE INVENTION

1. Field of the Invention

The present invention pertains to processing seismic data, and more particularly to applying residual moveout correction to common offset depth migrated data

2. Related Prior Art

Prior art has disclosed many methods for processing seismic data. One of the most common procedures is Normal Moveout (NMO) correction. A significant problem with processing and migrating seismic data in the application of NMO occurs at the extremities of a mapped boundary layer or interface. Even with improved techniques in the application of normal moveout correction, the ends of the boundary layer of seismic lines will curve up or down if an inaccurate velocity is selected. Examples of processing methods which include migration and normal moveout correction are as follows.

United States Registration number H482 titled "Seismic Migration Method" (John R. Berrvhill et al.) relates to a seismic data processing method in which seismic traces are subjected to Fourier transformations. The coefficients of the FourierTransformed traces are subjected to a recursive FK migration operation. The migrated traces are thereafter inverse-Fourier transformed. Each trace contains a signal resulting from reflection of a seismic signal at a location within the earth, and each trace is associated with at least one point in a twodimensional spatial grid (x,y). When displayed, the processed seismic data represents the position within the earth of whatever caused the reflection. The method may be employed to process stacked seismic traces, each associated with a single point (x,y) in the grid, or may be employed to process unstacked seismic traces, each associated with both a seismic source location $(x_s, y_s)$ and a different seismic receiver location $(x_r, y_r)$ in the grid. In performing the method, the earth is modeled as a stack of M horizontal layers, each characterized by a seismic wave velocity. The recursive FK migration step is iterated M - 1 times for each trace, where part of the output of each iteration is stored and part discarded.

United States Patent number 4,802,147 titled "Method for Segregating and Stacking Vertical Seismic Profile Data in Common Reflection Point Bins" (George P. Moeckel) relates to a method for segregating and stacking vertical seismic profile data. The offset difference between the well location and the position of the source is divided into equal segments. Vertical seismic profile moveout corrected data is placed in common reflection point bins and stacked.

United States Patent number 4,813,027 titled "Method and Apparatus for Enhancing Seismic Data" (Hans Tieman) relates to a method and apparatus for stacking a plurality of seismic midpoint gathers to provide a pictorial representation of seismic events. The approximate propagation velocity, corresponding to a selected event in a common midpoint gather, is determined by summing the common midpoint gather using first and second weights to provide respective first and second weighted sums over an offset based on an estimated velocity corresponding to the event. A velocity error value indicative of the approximate error between the estimated velocity and the actual velocity is developed from the sums. The common midpoint gather is then restacked in accordance with the determined propagation velocity to provide an enhanced pictorial representation of the seismic event. The first and second weighted sums are taken over a time window centered upon an estimated zero offset travel time for the event. The first and second weights can be selected to provide rapid, slow or intermediate convergence upon the true velocity. The velocity error value is determined as a function of the deviation of the peak of the first weighted sum from the center of the time window, relative to the deviation of the peak of the second weighted sum from the center of the time window. Alternatively, the velocity error value is determined as a function of the deviation of the peak of the cross-correlation of the first and second weighted sums from the center of the time window.

United States Patent number 4,241,429 titled "Velocity Determination and Stacking Process from Seismic Exploration of Three Dimensional Reflection Geometry" (Marvin G. Blocmcuist et al) relates to a method for determining the dip and strike of subsurface interfaces and average propagation velocity of seismic waves. In seismic exploration, linear, multiple fold, common depth point sets of seismograms with three dimensional reflection geometry are used to determine the dip and strike of the subsurface reflecting interfaces and the average velocity of the path of the seismic energy to the reflecting interface. The reflections in each set appear with time differences on a hyperbola with trace spacings determined by the source receiver coordinate distance along the lines of exploration. The offset of the apex of this hyperbola is determined from a normal moveout velocity search of the type performed on two dimensional common depth point (CDP) sets. This search identifies the correct stacking velocity and hyperbola offset which are used to determine dip, strike and average velocity.

United States Patent number 4,766,574 titled "Method for Depth Imaging Multicomponent Seismic Data" (Norman D. Whitmore, Jr., et al.) relates generally to a method of geophysical exploration. This method may be used for imaging multicomponent seismic data to obtain depth images of the earth's subsurface geological structure as well as estimates of compressional and shear wave interval velocities. In particular, measures are obtained of imparted seismic wavefields incident on reflecting interfaces the earth's subsurface and of resulting seismic wavefields scattered therefrom. The incident and scattered seismic wavefields are employed to produce time-dependent reflectivity functions which are representative of the reflecting interfaces. By migrating the time-dependent reflectivity functions, better depth images of the reflecting interfaces can be obtained. For a dyadic set of multicomponent seismic data, the dyadic set is partitioned in order to separate the variously coupled incident and reflected wavefields in the recorded multicomponent seismic data. The incident and reflected wavefields are cross-correlated to form reflectivity functions that are time-dependent. These time-dependent reflectivity functions are then iteratively migrated according to a model of wavefield velocities of propagation to obtain estimates of the compressional and shear wave interval velocity. The migrated reflectivity functions can then be stacked to produce depth images of the earth's subsurface geological structures.

United States Patent number 4,802,146 titled "Method for Moveout Correction and Stacking Velocity Estimation of Offset VSP Data" (George P. Moeckel) relates to a moveout correction process and stacking velocity estimation process to permit stacking of vertical seismic profile (VSP) data. The primary reflection time is determined by using the two-way travel time, the root mean square velocity of acoustic pulses in the formation and the first arrival time of direct path acoustic pulses.

United States Patent number 4,736,347 titled "Multiple Stacking and Spatial Mapping of Seismic Data" (Bernard Goldberg et al.) relates to a method for determining the dip of subsurface formations and the apparent acoustic velocity. Seismic traces are stacked in a plurality of orthogonal measures to form multiple stacked traces at a positive offset. The stacking process determines the apparent velocities as functions of the travel time at the positive offset. The interval acoustic velocity of the first layer is then determined from knowledge of surface topography, source-receiver offset, two-way travel times and the first reflector apparent velocities. The first layer velocity information enables the incident and emergent angles of the raypaths at the surface to be calculated, as well as enabling the dip angles and spatial coordinates of the reflection points on the first reflecting boundary to be determined. Seismic data corresponding to the second reflecting boundary are then mapped spatially to the first reflecting boundary by ray tracing and by calculating the apparent velocities at the first boundary. The process is repeated for each succeedingly deeper boundary. The derived acoustic velocity model of the earth is displayed as a stacked seismic section in spatial coordinates. This process may be applied to obtain earth models and seismic sections in both two and three dimensions.

A prior art method which has little connection with depth migration or moveout correction is contained in U.S. patent number 4,745,585. This patent is of interest because it illustrates a method whereby seismic data migration may be broken down into distinct portions.

United States Patent number 4,745,585 titled "Method of Migrating Seismic Data" (Kenneth L. Larner) relates to a method for migrating seismic data in steps where each step is a portion of the total migration. Seismic data is passed through a preselected number of migration stages. During each stage, data is migrated a plurality of times, where the migration-velocity function is a minor fraction of the velocity required to fully migrate the data in a single stage. The cascaded migration is used to migrate data having steeply-dipping events.

SUMMARY OF THE INVENTION

A method and apparatus for applying residual moveout correction to common offset depth migrated data is disclosed for use on data where common offset depth migration has been applied using the best available velocity/depth model. Post migrated parts, which are depth migrated common midpoint gathers, are saved. The post migrated parts are treated as if they were in time not depth. Normal moveout based on a constant velocity is removed. Velocity functions, that is, time-velocity pairs, are derived for the post migrated parts with normal moveout removed. This derivation is done using a standard velocity analysis program. Normal moveout based on these velocity functions is applied. As a result, the events on the post migrated parts are imaged to the same depth. The corrected post migrated parts are then stacked. Thus, residual moveout correction is applied to common offset depth migrated data.

DESCRIPTION OF THE PREFERRED EMBODIMENT

When seismic data is sorted into common offset panels, each offset can be processed as if it were an individual seismic section. Common offset depth migration converts each offset panel into a common offset depth section. Each of these represent the same subsurface structure. With a perfect velocity model, each offset section will yield identical images. For real seismic data, it is normally impossible to obtain a perfect velocity model and the migrated offset sections are different.

When these common offset depth sections are sorted into common migration basement gathers or Post Migration Parts (PMP's), differences in the images with offset can be readily seen. There are three gathers displayed in FIG. 1-3. Near offset traces are to the left. A flat imaged event indicates that the reflector was depth migrated to the same depth on each offset panel, and hence the velocity model used in the migration is correct. If the imaged event appears too deep at far offsets, it is under-migrated, and the velocity is too fast. If the imaged event appears too shallow at far offsets, it is over-migrated, and the velocity is too slow.

Figure 1:
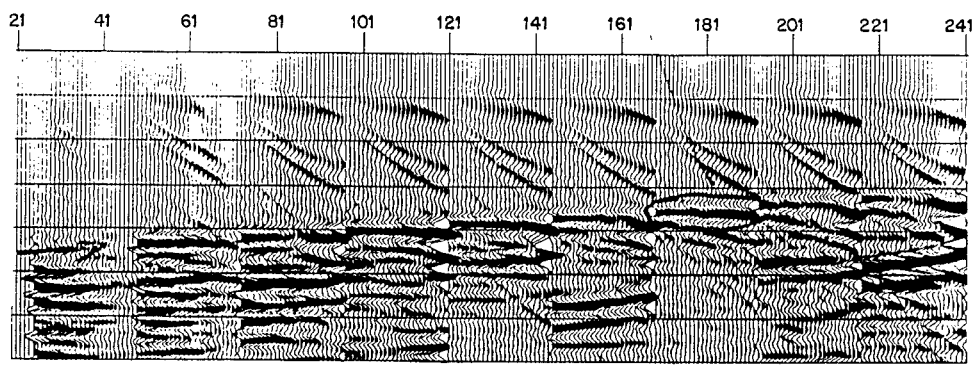
FIG. 1 is a common offset depth section wherein the velocity above the reflector is correct.
Figure 2:
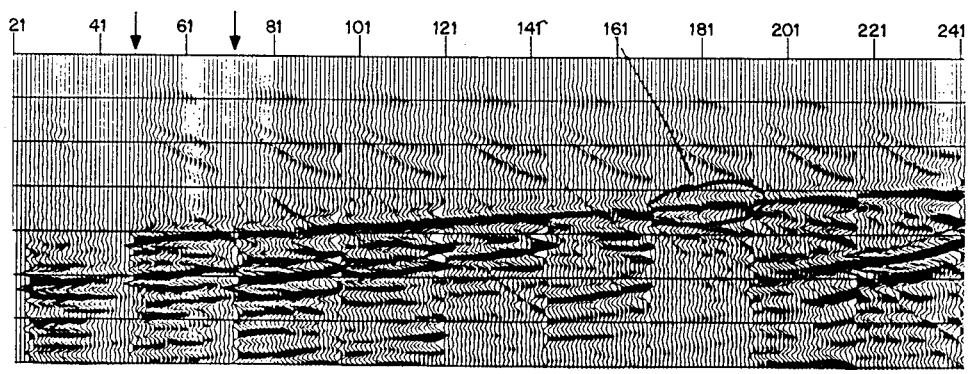
FIG. 2 is a common offset depth section wherein the velocity above the reflector is too low.
Figure 3:
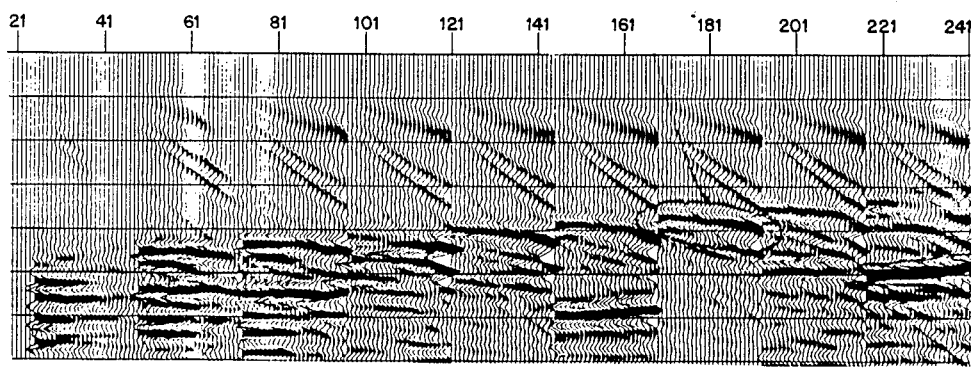
FIG. 3 is a common offset depth section wherein the velocity above the reflector is too high.

FIGS. 1-3 illustrate examples of these conditions as identified by the circled areas. In FIG. 1 the velocity above the reflector is correct (7,250 ft/sec), in FIG. 2, it is 7,000 ft/sec, 250 ft/sec too slow and the image is over-migrated. In FIG. 3, it is 7,500 ft/sec, 250 ft/sec too high and the image is under-migrated.

The standard pre-stack depth migration process will stack traces as they are imaged, and the post migrated parts are not available for further analysis. This result is equivalent to a brute stack. When the model is incorrect, the residual moveouts can be large, resulting in a poor stack. This is why standard prestack depth migration is so sensitive to the quality of the velocity model. A common offset depth migration program may be altered to save the imaged data before it is stacked in post migration parts. These post migration parts can then be treated with standard pre-stack processing techniques to correct for any residual moveout. This processing sequence provides a fine-tuned, moveout free set of post migration parts which produces a well imaged stacked section. This eliminates the expensive procedure of iterating to the optimum model for depth migration.

Figure 4:
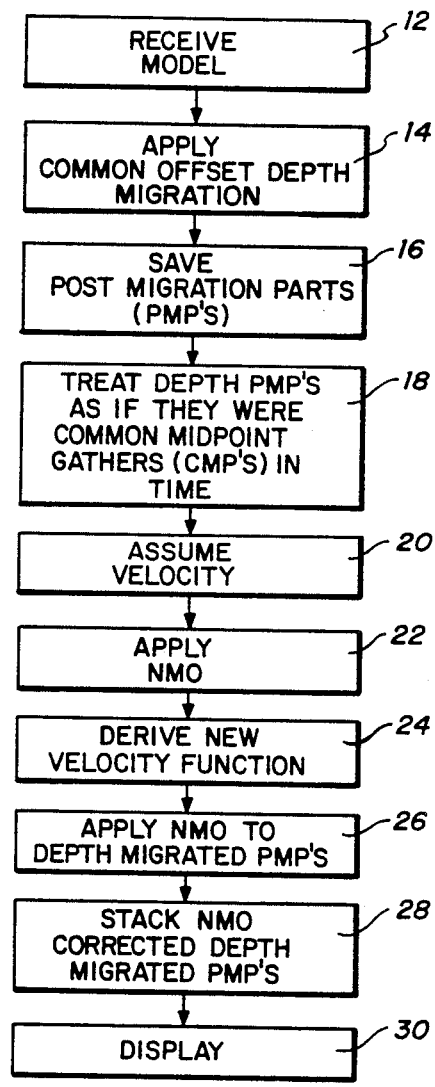
FIG. 4 is a flow chart of a method for residual moveout correction.

Referring now to FIG. 4, a flow chart of a method for residual moveout correction of the present invention is illustrated.

At step 12, data representing a seismic model is received. At step 14, common offset depth migration is applied to the model. The model should be the best available velocity/depth model. It is to be noted that it is unusual to obtain a velocity/depth model good enough to migrate all events at all offsets to the same depth. Usually there are events that are over migrated and events that are under migrated (see FIGS. 1–3).

Post migrated parts (PMP's) are saved at step 16. Post migrated parts are depth migrated common midpoint gathers. Saving the post migrated parts may be done at the same time and as part of the applying common offset depth migration.

A constant velocity is assumed for the depth migrated data at step 18. The only requirement for the assumed velocity is that it produces a delta t at the far offsets larger than the delta t produced by the largest over migration.

At step 18 the depth migrated parts are treated as if they were Common Midpoint Gathers in time. This allows the use of well understood programs that are standard to the industry for doing velocity analysis and for the application and removal of normal moveout.

At step 22, a normal moveout is applied which corresponds to the velocity selected at step 20. By treating the post migrated parts as if they were in time, this step can be easily accomplished.

A new velocity function is derived for the post migrated parts with normal moveout removed at step 24. The velocity functions are derived in time-velocity pairs. A standard velocity analysis program in common use in the art may be used since the post migrated parts are being treated as if they were in time.

Using this derived velocity function normal moveout correction is applied to the time migrated post migrated parts at step 26. The events on the post migrated parts are now imaged to the same depth. This means that the residual or curved ends of the normal moveout corrected data has been corrected to improve the accuracy of the seismic section. At step 28, the normal moveout corrected time migrated post migrated parts with residual moveout correction are stacked. At step 30, the resulting seismic section may be displayed, providing a greatly improved seismic section.

Figure 5:
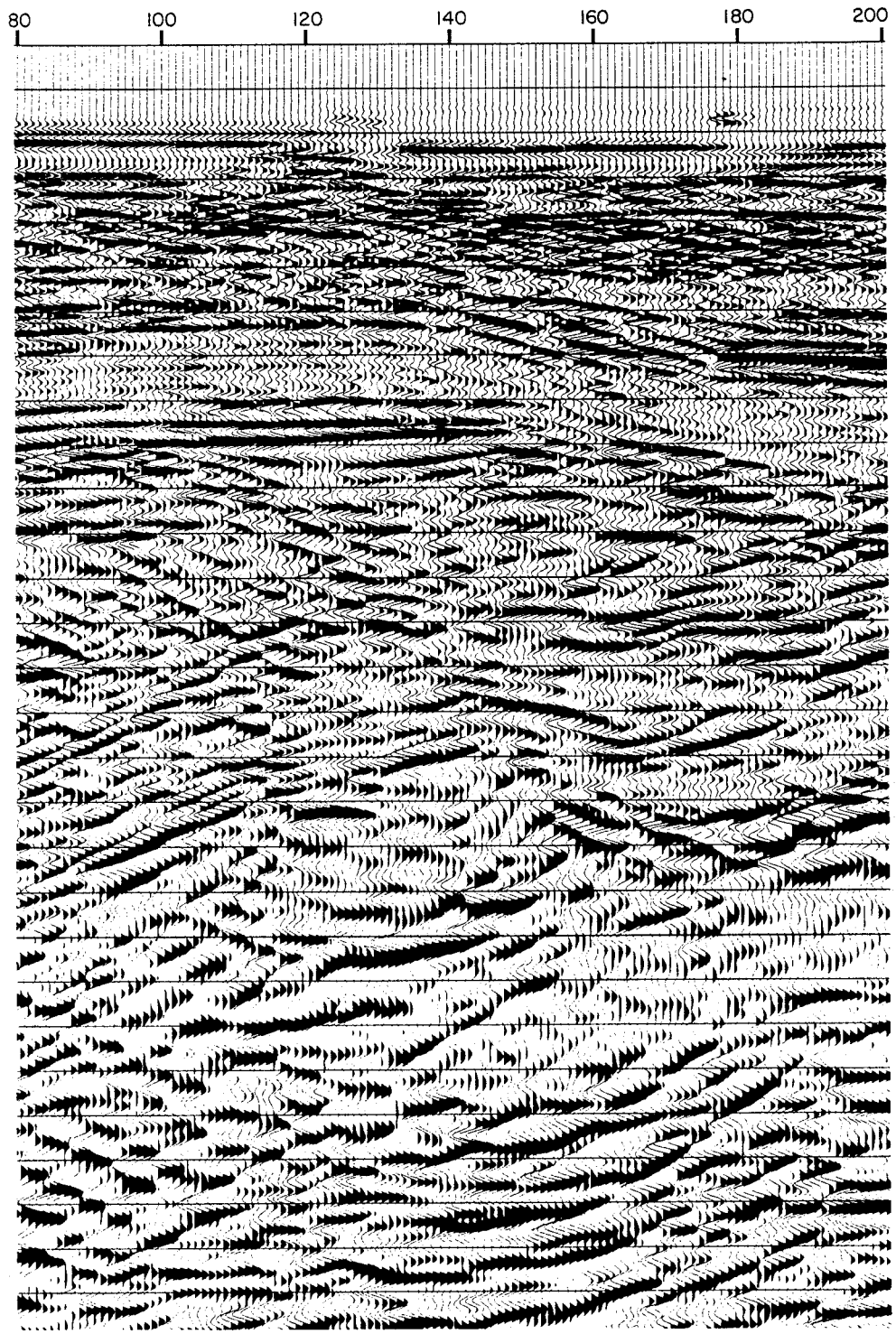
FIG. 5 is a seismic section using common offset depth migration, the correct velocity and stacking the post migration parts.
Figure 6:
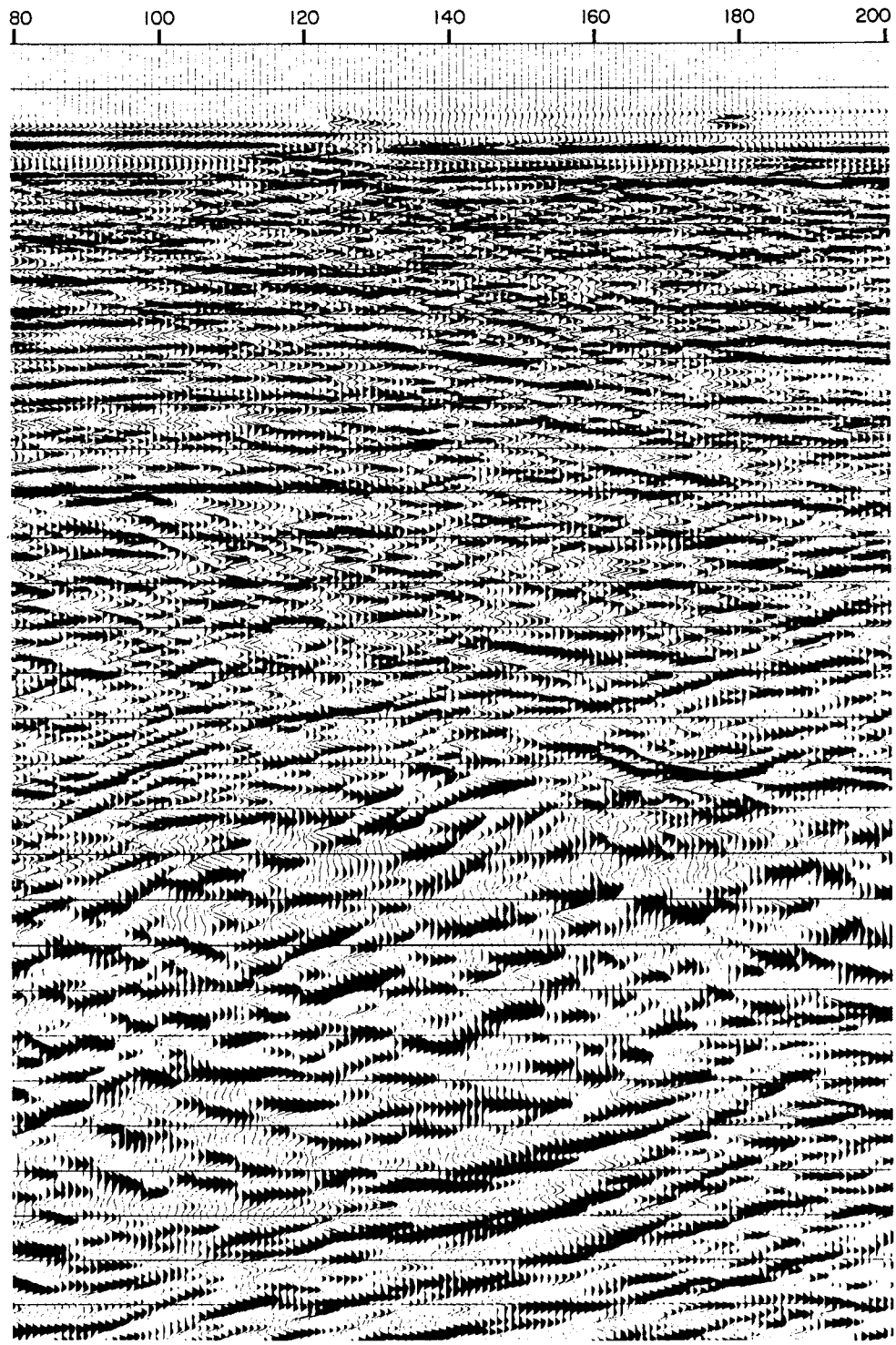
FIG. 6 is a seismic section using common offset depth migration, a velocity ten percent low and stacking the post migration parts.
Figure 7:
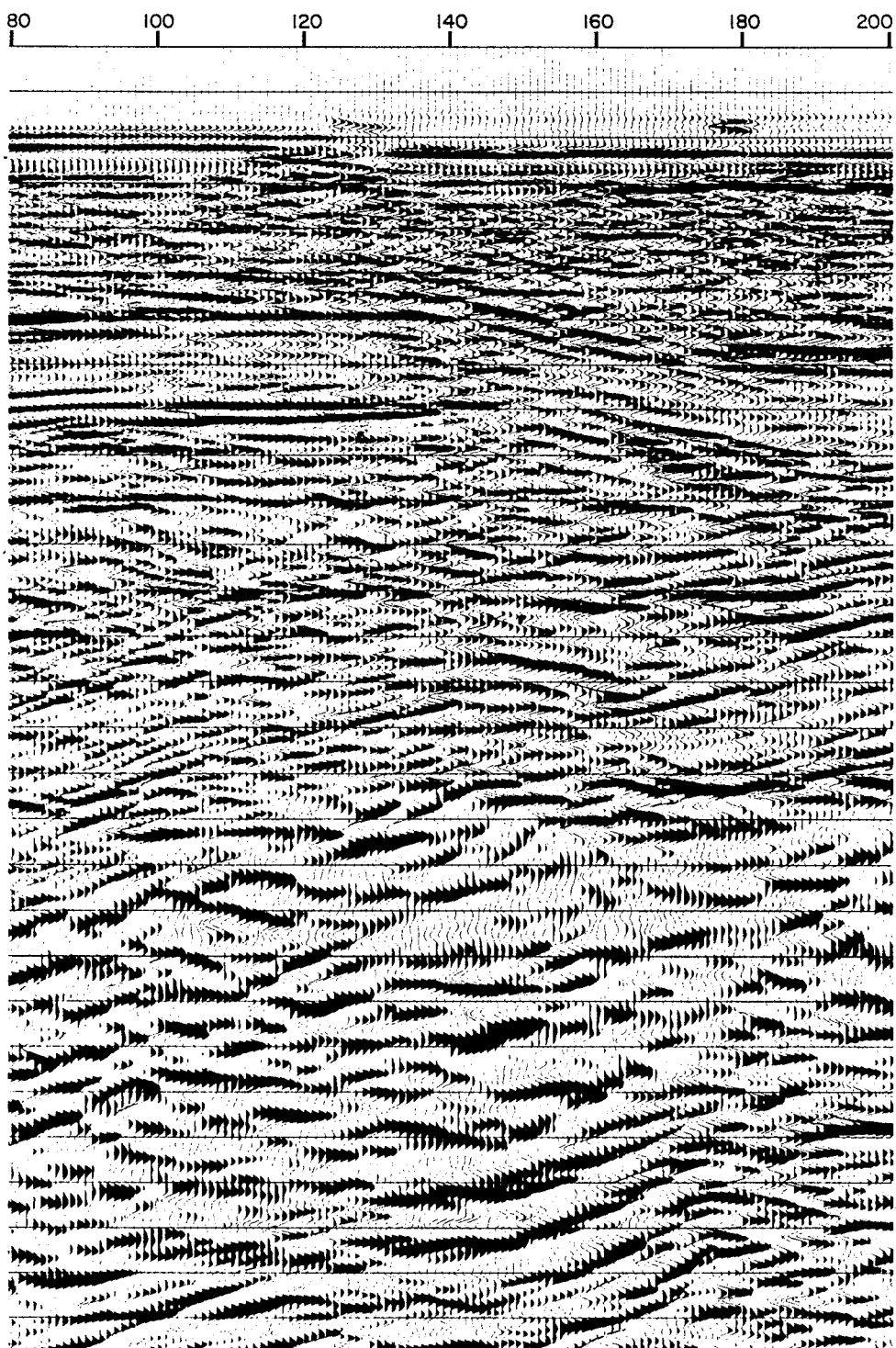
FIG. 7 is a seismic section using residual moveout correction, common offset depth migration, a velocity ten percent low and stacking the post migration parts.

A test was conducted in which a real data set from the Gulf of Mexico was migrated with two velocity models. One model was obtained from intensive study and is believed to be accurate. The second model was obtained by decreasing the velocities in the correct model by 10 percent. FIG. 5 shows the result of migrating the data into post migration parts with a common offset depth migration program which saves post migration parts, the correct velocity model and stacking the post migration parts. This can be considered an optimal result. FIG. 6 was obtained by migrating and stacking the data with the low velocity model without the RMC (Residual Moveout Correction) of the present invention. Because the velocity was incorrect, the reflections were improperly migrated and did not stack correctly, resulting in a poor end result. FIG. 7 was obtained in the same manner as FIG. 6 except that RMC was used to improve the data before it was stacked. The end result rivals that of FIG. 5.

There are many advantages in using a method which saves post

What is claimed is: migration parts and applying residual moveout correction instead of the standard ray-tracing pre-stack depth migration program. First, the output of the standard process is equivalent to a brute stack. The problem with this procedure is that the velocity model required for the depth migration is rarely perfect, therefore the post migration parts do not contain perfectly flat reflectors. Saving post migration parts and applying residual moveout correction can better flatten these images so that the final depth section has sharper, more continuous events. Second, weaker images can be enhanced using the present invention where post migration parts are saved and residual moveout correction is applied. The procedure may be useful for sub-salt imaging. Third a good velocity model is needed for a successful pre-stack depth migration. Using the present invention, the deviation of the reflection images in the post migration parts from the ideal result can be observed, which is the imaging of perfectly flat events within post migration parts. The amount and direction of the deviation tells us how the velocity model needs to be changed. This provides the potential for developing a quick, inexpensive procedure for generating the velocity model. Fourth, moveout deviations within post migration parts permit the design of residual depth stretching of the final depth section to produce a more accurate result. The application of a residual moveout and stretching permits the production of an accurate, well imaged depth section without the need of the expensive procedure of iterating, testing, and converging to the best velocity model.

1. A method for applying residual correction to normal moveout correction of common offset depth migrated data comprising the steps of:
   applying common offset depth migration using the best available velocity/depth model;
   saving post migrated parts, said post migrated parts being depth migrated common midpoint gathers;
   equating the depth migrated post migrated parts to time migrated post migrated parts;
   removing normal moveout based on a constant velocity;
   deriving velocity functions for the post migrated parts with normal moveout removal;
   applying normal moveout based on these velocity functions;
   imaging events on the post migrated parts to the same depth; and
   stacking the corrected post migrated parts.

2. The method according to claim 1 wherein the deriving step includes the step of:
   using a standard velocity analysis program for removing normal moveout.

3. A method for residual correction of normal moveout correction of common offset depth migration comprising the steps of:
   receiving a velocity/depth model;
   applying common offset depth migration to said velocity/depth model;
   saving depth migrated common midpoint gathers;
   treating said depth migrated common midpoint gathers as common midpoint fathers in time;
   assuming a constant velocity;
   removing normal moveout correction from said depth migrated common midpoint gathers;

deriving velocity functions for said depth migrated common midpoint gathers with said normal moveout correction removed;

applying a normal moveout correction to said depth migrated common midpoint gathers based on said derived velocity functions; and stacking said depth migrated common midpoint gathers with said normal moveout correction having residual correction based on said derived velocity functions applied.

4. The method according to claim 3 wherein the deriving step includes the step of:

using a standard velocity analysis program for removing normal moveout.

5. A method for residual correction of normal moveout correction of common offset depth migration comprising the steps of:

receiving a seismic velocity/depth model;

applying common offset depth migration to said velocity/depth model;

saving depth migrated post migrated parts;

treating said depth migrated post migrated parts as migrated common midpoint gathers in time;

removing normal moveout correction from said depth migrated common midpoint gathers, based on a constant velocity;

deriving velocity functions for said depth migrated common midpoint gathers with said normal moveout correction removed;

applying a normal moveout correction to said depth migrated common midpoint gathers based on said derived velocity functions; and stacking said depth migrated common midpoint gathers with said normal moveout correction having residual correction based on said derived velocity functions applied.

6. The method according to claim 5 wherein the deriving step includes the step of:

using a standard velocity analysis program for removing normal moveout.

* * * * *